United States Patent [19]

Sodos

[11] Patent Number: 5,386,532
[45] Date of Patent: Jan. 31, 1995

[54] METHOD AND APPARATUS FOR TRANSFERRING DATA BETWEEN A MEMORY AND A PLURALITY OF PERIPHERAL UNITS THROUGH A PLURALITY OF DATA CHANNELS

[75] Inventor: Martin Sodos, San Jose, Calif.

[73] Assignee: Sun Microsystems, Inc., Mountain View, Calif.

[21] Appl. No.: 814,765

[22] Filed: Dec. 30, 1991

[51] Int. Cl.⁶ .................. G06F 12/08; G06F 13/00
[52] U.S. Cl. .................. 395/425; 364/DIG. 1; 364/244.8; 364/246.4; 364/911.3
[58] Field of Search ... 364/200 MS File, 900 MS File; 395/400 MS File, 425 MS File

[56] References Cited

U.S. PATENT DOCUMENTS

| | | | |
|---|---|---|---|
| 4,371,932 | 2/1983 | Dinwiddie, Jr. et al. | 364/200 |
| 4,403,282 | 9/1983 | Holberger et al. | 395/400 |
| 4,750,107 | 6/1988 | Buggert | 395/275 |
| 4,750,150 | 6/1988 | Weppler | 395/275 |
| 4,831,523 | 5/1989 | Lewis et al. | 364/200 |
| 4,847,757 | 7/1989 | Smith | 364/200 |
| 4,896,266 | 1/1990 | Klashka et al. | 364/200 |
| 5,056,015 | 10/1991 | Baldwin et al. | 395/275 |
| 5,157,775 | 10/1992 | Sanger | 395/425 |
| 5,261,064 | 11/1993 | Wyland | 395/400 |

FOREIGN PATENT DOCUMENTS

| | | |
|---|---|---|
| WO84/00222 | 1/1984 | European Pat. Off. |
| 0432978 | 6/1991 | European Pat. Off. |
| WO91/11767 | 8/1991 | European Pat. Off. |
| 0486145 | 5/1992 | European Pat. Off. |

OTHER PUBLICATIONS

IBM Technical Disclosure Bulletin, vol. 32, No. 8A High Speed Buffer for N×1 Packet Multiplexing, Jan. 1990, New York, U.S.A.

*Primary Examiner*—Joseph L. Dixon
*Assistant Examiner*—Reba I. Elmore
*Attorney, Agent, or Firm*—Blakely Sokoloff Taylor & Zafman

[57] ABSTRACT

A method and apparatus for supporting multiple DMA channels by splitting data transfers for each channel into sequences of data slices and interleaving on a slice-by-slice basis. While the control of transfer resources may be shifted among the DMA channels, the ordering of the data slices for each channel is preserved. The present invention also discloses a circuit architecture capable of supporting the multiple interleaving DMA channels. The circuit architecture comprises a dual-port memory, channel sequencer, and channel interleave control. The dual-port memory stores slices of data to be transferred through the channels. A channel sequencer maintains the channel ordering of data slices in the dual-port memory. A channel interleave control unit allows channels to interleave their data transfers by monitoring the channel interleave size, current data transfer count and total transfer count per channel. A second channel is allowed to transfer data through the same medium as a first channel either when the first channel has reached its channel interleave size, or when the first channel has transferred its requested total transfer count, thus providing efficient bus utilization.

9 Claims, 7 Drawing Sheets

METHOD AND APPARATUS FOR TRANSFERRING DATA BETWEEN A MEMORY AND A PLURALITY OF PERIPHERAL UNITS THROUGH A PLURALITY OF DATA CHANNELS

RELATED APPLICATIONS

The present patent application is related to pending patent applications, entitled "METHOD OF AND APPARATUS FOR INTERLEAVING MULTIPLE-CHANNEL DMA OPERATIONS," Ser. No. 841,766; "METHOD AND APPARATUS FOR THE CHAINING OF DMA OPERATIONS," Ser. No. 851,802; and "METHOD AND APPARATUS FOR THE PREVENTION OF RACE CONDITIONS DURING DYNAMIC CHAINING OPERATIONS," Ser. No. 814,864, now U.S. Pat. No. 5,251,312 which issued Oct. 5, 1993; and all filed on the same date as the present patent application.

BACKGROUND OF THE INVENTION

1. Field of the Invention

The present invention relates to data transfer operations in a computer system and more specifically, to direct memory access operations in a computer system.

2. Art Background

In a computer system with multiple data processing devices, data transfers occur not only between one device and another, but also between one device and a plurality of other devices in a time-multiplexing fashion to achieve system efficiency. For example, a central processing unit ("CPU") may transfer data to a network device while time-multiplexing data transfer activities with other devices to fully utilize the CPU. Because data transfer rates from various devices may be different, buffers are sometimes implemented as an intermediary between each device and the CPU to optimize data transfer rates of multiple devices. With buffers, data can be temporarily stored until the transfer resource is available or when the transfer destination is free. Implementing a buffer for each device creates a problem for an integrated circuit when there are more and more devices interacting with the CPU, as the more sophisticated systems often require. In an integrated circuit, the die-size limitation simply does not permit more and more buffers and their associated decode logic to be added.

Figure 1:
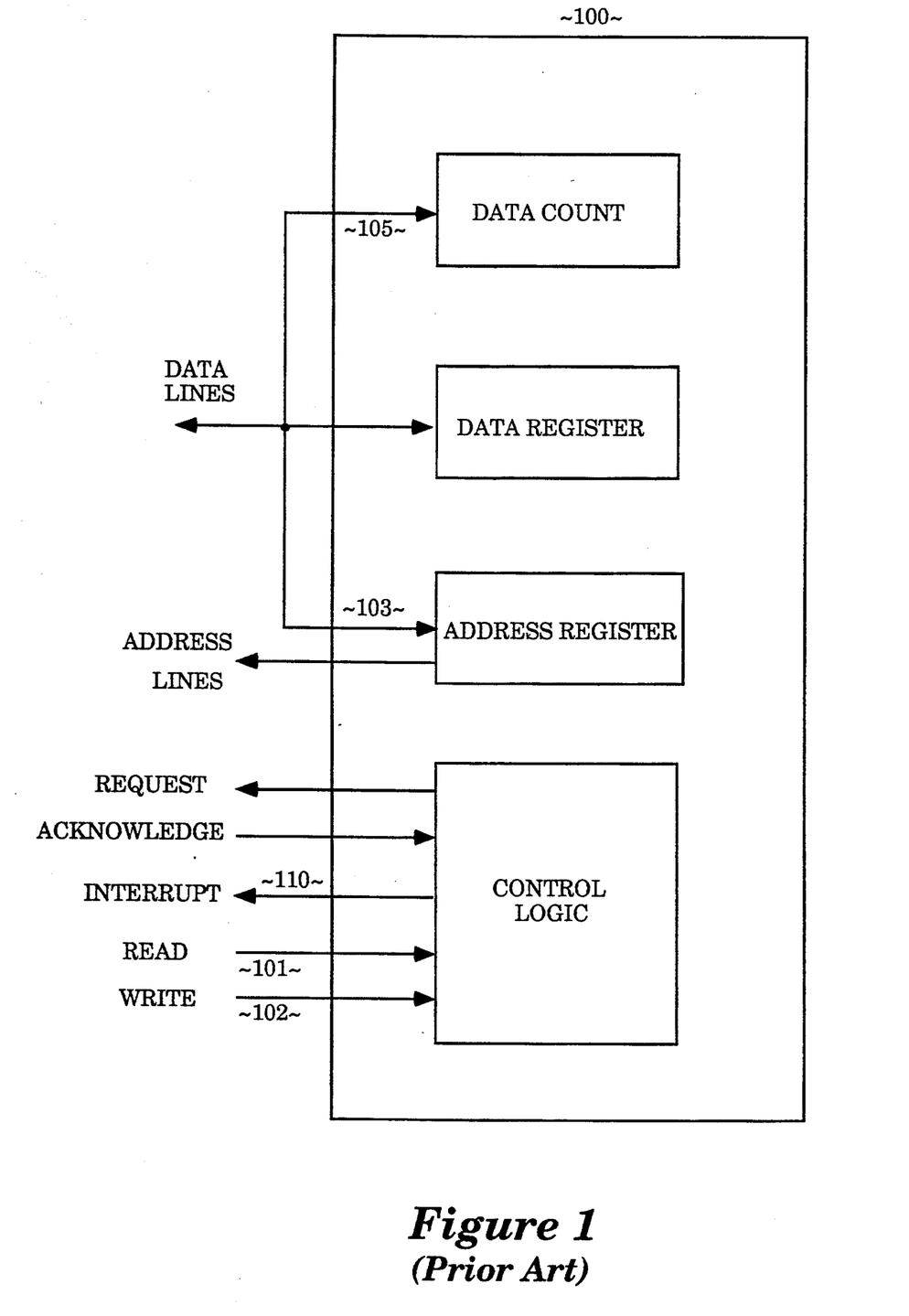
FIG. 1 is a pictorial representation of a DMA controller module.

The problem can be illustrated by direct memory access operations transferring data in multiple channels in a computer system. Direct memory access ("DMA") operation is a technique used for computer input/output("I/O") operations when large volumes of data are to be moved. DMA typically involves an additional module on the system bus. DMA module 100 such as shown in FIG. 1, is capable of emulating the CPU (not shown) and of taking over control of the system bus from the CPU. A DMA operation works as follows: when the CPU wishes to read or write a block of data, it issues a command to DMA module 100. The command includes information regarding whether a read 101 or write 102 is requested, the address 103 of the I/O device involved, the starting location in memory to read from or write to, and the number 105 of words to be read or written. The CPU then continues with other tasks because it has delegated this I/O operation to the DMA module, and the module will take care of the task. The DMA module thus transfers the entire block of data, one word at a time, directly to or from memory, without going through the CPU. When the transfer is completed, the DMA module sends an interrupt signal 110 to the CPU. As such, the CPU only needs to get involved at the beginning and end of the transfer.

The DMA module needs to take control of the bus in order to transfer data to and from memory. For this purpose, the DMA module must use the bus only when the CPU does not need it, or the DMA module must force the CPU to temporarily suspend its operation. Since the only function this DMA module performs is data transfer, the transfer sequence can be hard-wired into the module circuit. By fetching instructions at a much higher level, the use of band-width can be minimized. Since the DMA module has the capability of generating the address and control signals required by the bus, the DMA module is capable of performing I/O operations at full memory speed.

In today's efficient computer systems, DMA operations must also accommodate multiple-channel data transfers with a variety of devices. To facilitate the data transfers, an independent buffer is allocated to a DMA channel. However, as the number of DMA channel's increases for more sophisticated operations, "the one-buffer-per-channel" approach becomes less desirable, if not totally impractical. Further, although a single buffer, such as a first-in, first-out ("FIFO") buffer, may serve as an intermediary for the multiple-channel DMA operations, the FIFO still experiences the problem of bottlenecking when one channel needing all the data right away is blocked by another channel's data. Also, as data are transferred into the FIFO, the FIFO is bound to become full, thus forcing transfers to a stop until some data in the FIFO are read out. For the above reasons, the FIFO's in the prior art multiple-channel transfers cannot achieve high band-width and continuous operations.

As will be described in the following, the present invention discloses a method and apparatus for transferring data through multiple DMA channels by interleaving the transfer sequences from different channels to achieve high band-width and efficient resource utilization. Also disclosed is a circuit architecture to be most advantageously used in conjunction with supporting multiple-channel DMA transfers to maximize bandwidth and system efficiency.

SUMMARY OF THE INVENTION

Therefore, it is an object of the present invention to support multiple-channel DMA operations.

It is also an object of the present invention to support multiple-channel DMA transfers in a continuous flow of operation.

It is another object of the present invention to achieve high band-width multiple-channel DMA transfers by interleaving the channels.

It is further object of the present invention to provide a circuit architecture to be most advantageously used in conjunction with a plurality of interleaving DMA channels.

It is another object of the present invention to provide a circuit architecture for supporting a plurality of DMA channels with independent reading and writing for each channel.

It is another object of the present invention to provide a circuit architecture to achieve efficient bus utilization for the interleaving DMA channels.

As will be described, the present invention discloses a method and apparatus for supporting multiple-channel DMA operations by splitting data transfers for each channel into sequences of data slices and interleaving the transfer on a slice-by-slice basis. While the control of transfer resources may be shifted among the DMA channels, the ordering of the data slices for each channel is preserved. The present invention also discloses a circuit architecture to be most advantageously used with the multiple interleaving DMA channels. The circuit architecture comprises a dual-port memory, channel sequencer, and channel interleave control. The dual-port memory stores slices of data to be transferred through the channels. A channel sequencer maintains the channel ordering of data slices in the dual-port memory. A channel interleave control unit allows channels to interleave their data transfers by monitoring the channel interleave size, current data transfer count and total transfer count per channel. A second channel is allowed to transfer data through the same medium as a first channel either when the first channel has reached its channel interleave size, or when the first channel has transferred its requested total transfer count, thus providing efficient bus utilization.

BRIEF DESCRIPTION OF THE DRAWINGS

The objects, features and advantages of the present invention will be apparent from the following detailed description in which.

NOTATION AND NOMENCLATURE

The detailed descriptions which follow are presented largely in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases there should be borne in mind the distinction between the method operations in operating a computer and the method of computation itself. The present invention relates to method steps for operating a computer in processing electrical or other (e.g., mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the description given.

CODING DETAILS

No particular programming language has been indicated for carrying out the various procedures described herein. This is in part due to the fact that not all languages that might be mentioned are universally available. Each user of a particular computer will be aware of a language which is most suitable for his immediate purposes. In practice, it has proven useful to substantially implement the present invention in an assembly language which provides a machine executable object code. Because the computers and the monitor systems which may be used in practicing the instant invention consist of many diverse elements, no detailed program listing has been provided. It is considered that the operations and other procedures described herein and illustrated in the accompanying drawings are sufficiently disclosed to permit one of ordinary skill to practice the instant invention.

DETAILED DESCRIPTION OF THE INVENTION

As will be appreciated by those skilled in the art, the channel interleaving method and apparatus of the present invention allows multiple-channel transfers to proceed in an orderly and efficient manner by splitting the data transfer sequences into slices and interleaving the slices from different channels. The present invention also discloses a circuit architecture for supporting the interleaving channels such that sliced data are transferred through their respective channels. The channel interleaving method and apparatus thus achieves better bus utilization and higher band-width by interleaving other channels when the transfer resource is not used by one channel. In the following description for purposes of explanation, specific memories, organizations, and architectures, etc. are set forth in order to provide a thorough understanding of the present invention. However, it will be apparent to one skilled in the art that the present invention may be practiced without these specific details. In other instances, well known circuits are shown in block diagram form in order not to obscure the present invention unnecessarily. Furthermore, as will be apparent from the following description, the interleaving channel method and apparatus may utilize other buffering scheme aside from the unique circuit architecture described. Similarly, the unique circuit architecture may be utilized in conjunction with other multiple-device transfers in addition to the interleaving method and apparatus of the present invention disclosed.

Figure 2:
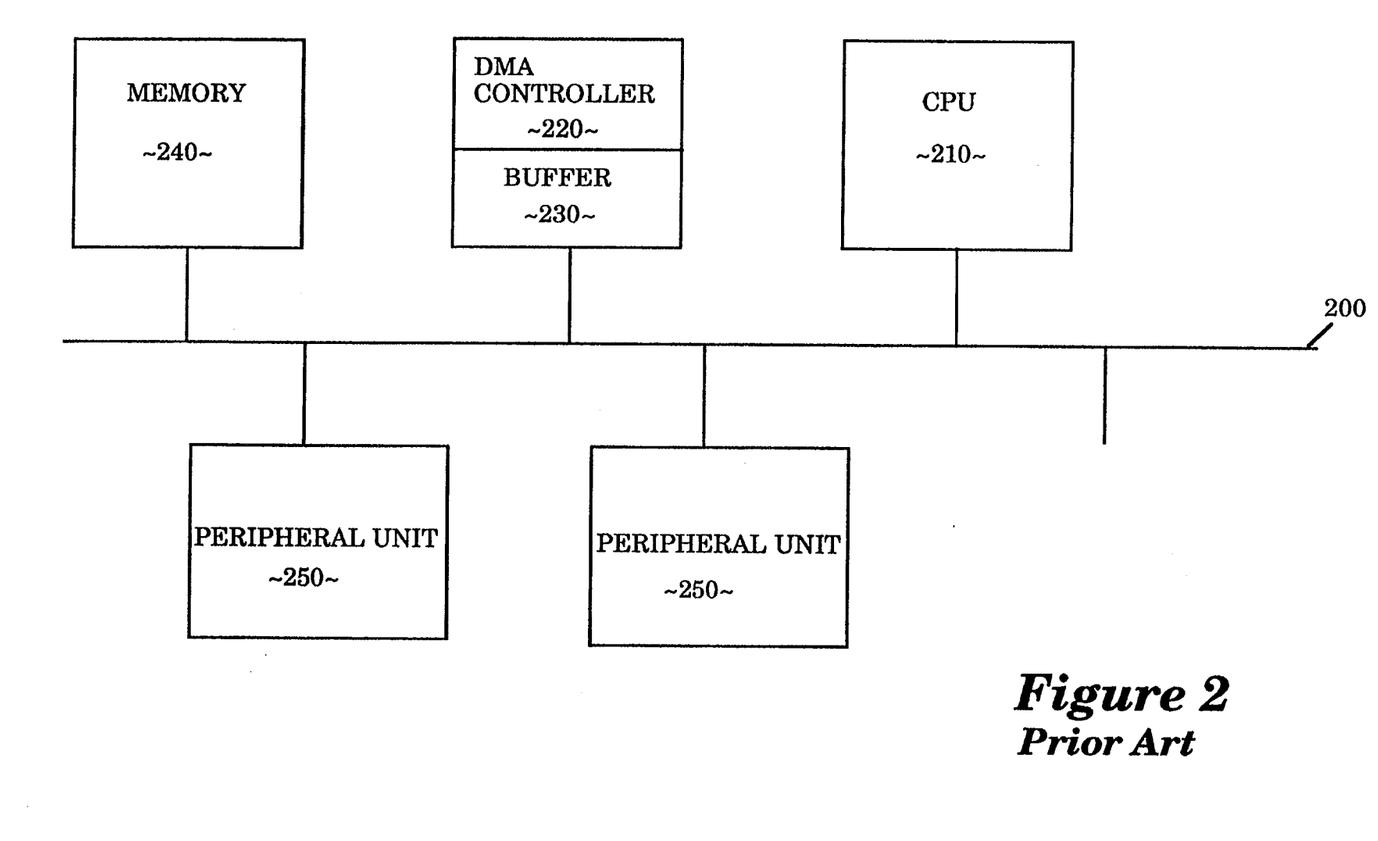
FIG. 2 is a block diagram representation of a computer system with a DMA controller module.

With reference to FIG. 2, a computer system with a DMA controller is shown in block diagram. A DMA controller module 220 facilitates data transfers among memory 240 and various peripheral units 250 by obtaining control of the system bus 200 when the CPU 210 is not using the system bus 200. Buffer 230 coupled to DMA controller module 220 provides data buffering for data transfers. As will be appreciated by those skilled in the art, an architecture capable of supporting multiple DMA channels will significantly enhance the performance of DMA operations among memory 240 and various peripheral units 250.

Figure 7:
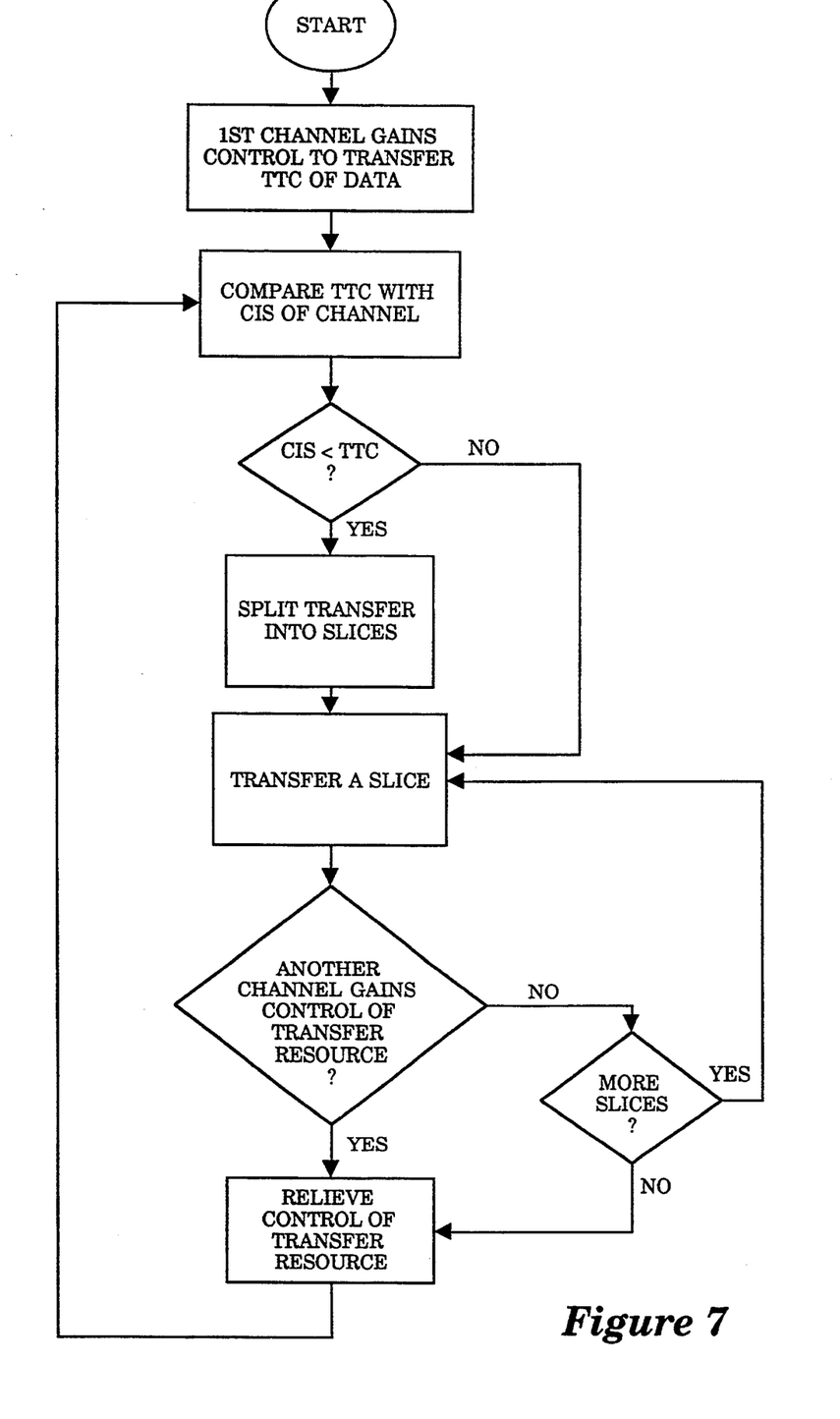
FIG. 7 is a flow chart illustrating the channel interleaving process.

Reference is now made to FIG. 7, where a flow chart of the DMA channel interleaving method is shown. Initially, a DMA request for transferring a total_transfer_count ("TTC") of data through channel M is made. The TTC is compared with a pre-determined channel_interleave_size ("CIS") of channel M to determine whether the transfer sequence should be split into two or more separate slices such that the slices from channel M may be interleaved with slices from another channel N wishing to use the same transfer resources. If the TTC from channel M is less than or equal to its CIS, the transfer is completed in one slice. It should be noted that the CIS of a DMA channel specifies the amount of data the DMA channel needs to transfer before another DMA channel can interleave using the same transfer resources as the first DMA channel. Thus, when channel M's TTC is within its CIS, the data can be readily transferred through in one slice.

If channel M's CIS is less than its requested TTC, the transfer of TTC is split time-wise into multiple slices of CIS-size data, each of which can be transferred through the transfer resources. After the transfer of each slice for channel M, the control of transfer resources is made available for another slice of data from another channel to interleave. The control of the transfer resources can be passed to another channel with a higher priority by the channel's priority arbitration scheme, which may be on a rotating or a fixed basis. If another channel N gains control of the transfer resources after channel M's slice, a data slice from channel N can be transferred using the transfer resources. The control of the transfer resources will also pass from channel N to other channel's with higher priority after each slice, if present. It will be apparent to those skilled in the art that there should be a counting mechanism to keep track of each channel's current_transfer_count ("CTC"). Therefore, when there are data transfers for multiple DMA channels through the same transfer resources, a data transfer sequence through each DMA channel is split time-wise into multiple slices according to its TTC and CIS and interleaved with other DMA channels. As a result, multiple DMA data transfers are channel-interleaved in their slices in random orders until all the sequences are completed.

Although various buffering embodiments capable of supporting channel interleaving of the present invention can be constructed by those skilled in the art, a circuit architecture for supporting channel interleaving is described below as the preferred embodiment with reference now made to FIG. 3. The control structure 300 comprises a dual-port memory 320 and a channel sequencer 330. The dual-port memory 320 writes and reads data for DMA data transfers and operates in a wrap-around fashion with read pointer 321 and write pointer 325. The write pointer 325 points to a data location 327 in the dual-port memory 320 to be written to next. When data is written to the dual-port memory 320, the write pointer 325 moves to a next location in dual-port. memory 320. The read pointer 321 points to a data location in the dual-port memory 320 to be read next. Thus, data is read out of the dual-port memory 320 at the location pointed to by read pointer 321. The write pointer 325 is the leading pointer such that when two pointers coincide, or "bump up" against each other, the dual-port memory 320 is empty; and when write pointer 325 is located immediately behind read pointer 321, the dual-port memory 320 is full. Typically, the control 300 starts its operation with an empty state. Further, as those skilled in the art will appreciate, the write pointer 325 should never pass the read pointer 321 such that valid data are not overwritten before they are read out of the dual-port memory 320.

Figure 3:
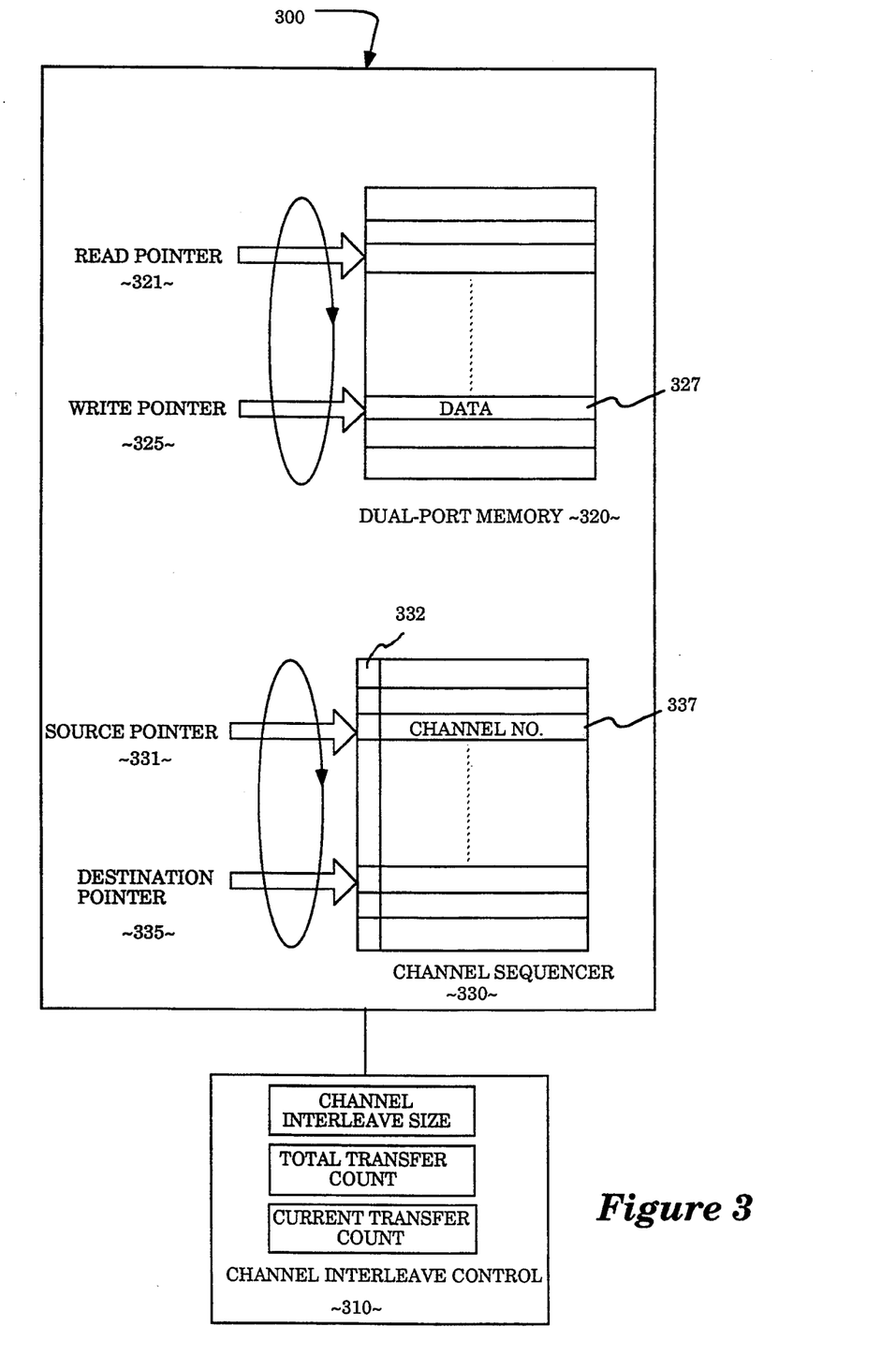
FIG. 3 is a pictorial representation of a circuit architecture for supporting the multiple interleaving DMA channels incorporating the teachings of the present invention.

With reference to FIG. 3, the channel sequencer 330 records DMA channel numbers associated with each DMA data transfer through the dual-port memory 320 such that channel sequencing corresponding to data buffered in the dual-port memory 320 is preserved when multiple channels are exercising DMA transfers with the dual-port memory 320. The channel sequencer 330 operates in a wrap-around fashion with a source pointer 331 and a destination pointer 335. The source pointer 331 writes a channel number to a location 327 in the channel sequencer 330 representing the channel from which data are written. The source pointer 331 increments to a next location in the channel sequencer 330 to be ready for a next channel number to be written to. The destination pointer 335 initiates data transfer out of the dual-port memory 320 by pointing to a location in the channel sequencer 330 such that data are read out of the dual-port memory 320 into the channel indicated by the destination pointer 335 in the channel sequencer 320. Thus, data are written into and read out of the dual-port memory 320 in the same channel. It should be apparent to those skilled in the art that the source pointer 331 and the destination pointer 335 do not cross one another to avoid misdirecting data transfers.

Further, with reference still made to FIG. 3, when a resource such as a bus is not available for facilitating data transfer, the source pointer 331 skips over and tags the location at tag 332 in the channel sequencer 330. Thus, when the destination pointer 335 moves to the tagged location, the destination pointer 335 reads tag 332 to know that data transfer has not been performed by the source pointer 331 in relation to the tagged location of the channel sequencer 330. As a result, the destination pointer 335 does not cause data to be transferred out according to the tagged location, invalidates or resets the tag 332 and skips to transfer the channel in the next location. This is to ensure that the circuit architecture of the present invention does not transfer data out more than it has transferred in with respect to the same channel. It should be noted that the "skip-over" may occur when there is not enough room in the dual-port memory 320 to write data or when the bus is not available for transfer.

When the unique circuit architecture is used to support channel interleaving, the channel interleave control 310 allows channels to interleave their transfers by monitoring the channel interleave size, total transfer size and current transfer size for each channel in both write and read directions. The channel interleave size of each channel specifies the number of bytes a first channel must transfer before another channel can interleave its transfer using the same resource as the first channel. The total transfer size specifies the total number of data bytes a specific channel has been requested to transfer through the dual-port memory 320. The current transfer count records both current write and current read counts in progress for each channel with respect to data bytes buffered in the dual-port memory 320. In response to a request for data of a total transfer size through a channel, the channel interleave control 310 determines the number of data slices the current transfer can be split into by reading that channel's channel interleave size and total transfer size. If data transfer can be split into more than one data slice, then the channel interleave control 310 can allow a second channel to execute its transfer after the first channel has transferred up to its channel interleave size. The channel interleave control also monitors the current transfer count of each channel in both write and read directions such that the circuit architecture of the present invention keeps track of how many data bytes it has transferred for each channel and how many more to transfer, in addition to when channel interleave can occur. As such, the circuit architecture of the present invention can proceed with transfers by executing data slice transfers from different channels in random orders until various DMA transfer sequences are complete because the channel ordering associated with the data slices is maintained by the channel sequencer 330 and channel interleave control 310.

It should be noted that because channel interleaving involves various transfer sizes, a situation arises when the channel transfer in one location of the channel sequencer 330 is completed before the channel transfer in another location. This situation causes the channel sequencer 330 to have randomly scattered gaps, although the channel sequencer 330 is initially loading channels sequentially through its source pointer. To allocate channels incoming to the randomly scattered locations in the channel sequencer 330 to indicate transfer sources, it should be apparent to those skilled in the art that incoming channels are not allocated to locations which are between the source and destination pointers (i.e., behind the source pointer and ahead of the destination pointer). Thus, the new channels are not in the locations to be hit first by the destination pointer 335 and the sequence of the locations are preserved in the channel sequencer 330.

Further, the channel interleave control 310 determines whether data of less than that channel's channel interleave size is to be transferred, such as the remaining portion of a transfer ("remnant"), by comparing the channel interleave size with the difference between the total transfer size and current transfer count. If data of less than the channel interleave size is to be transferred through a channel, the channel interleave control 310 allows another channel to execute its transfer as soon as the first channel's transfer is complete so as to achieve better bus utilization. Also, where there is no other channel requesting data transfer after the first channel completes its transfer, the channel interleave control 310 allows the first channel to continue transfer or to respond to further request, whichever the case may be. The channel interleave control 310 can theoretically be a processor which processes information regarding the channel interleave size, current transfer count and total transfer size for each channel.

Figure 4:
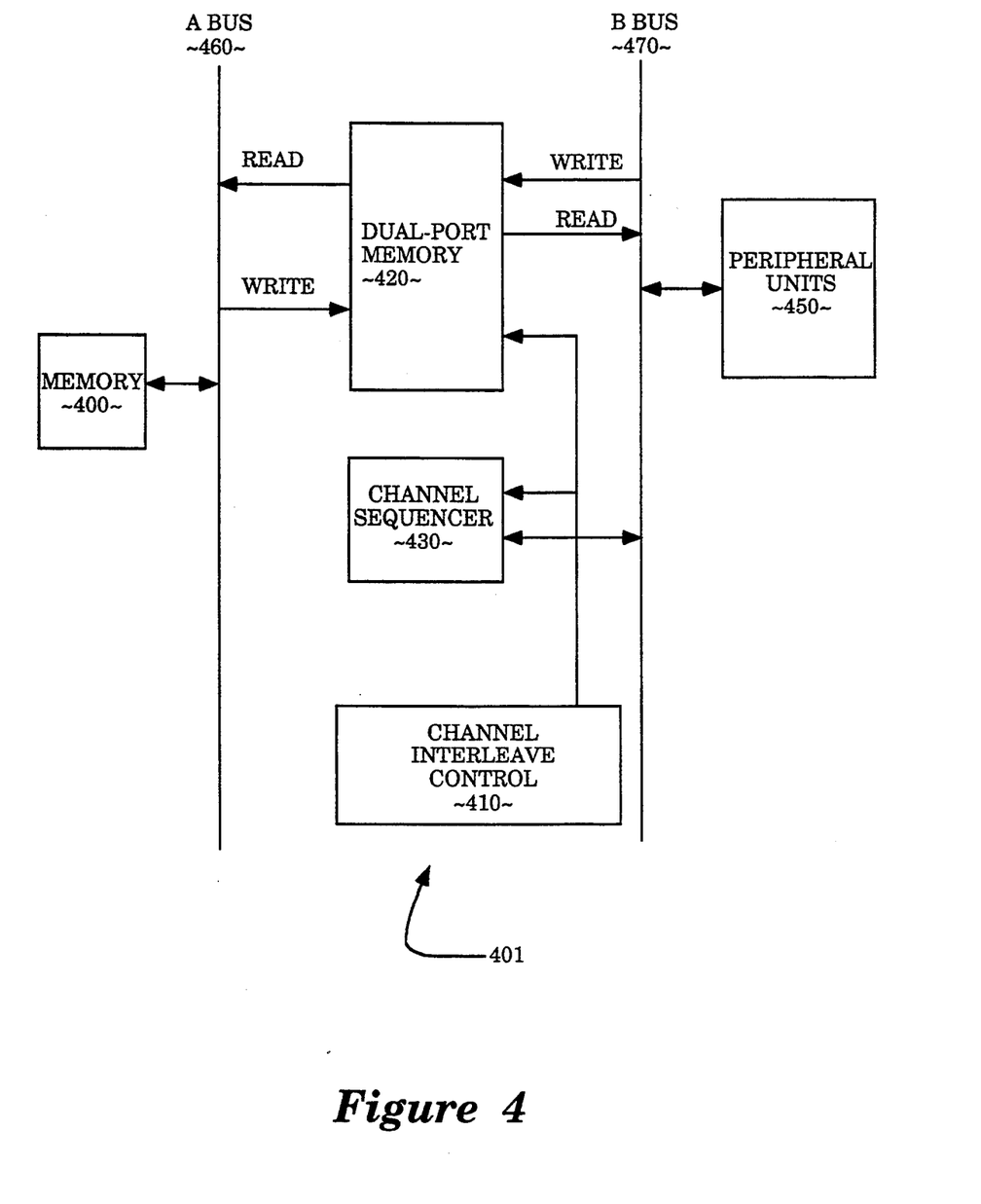
FIG. 4 is a pictorial representation of a circuit architecture incorporating the teachings of the present invention.

With reference to FIG. 4, the operation of the unique circuit architecture for channel interleaving is described through an exemplary transfer operation. At first, a DMA transfer requests 1000 bytes of data through channel 1, which has been programmed to have a channel interleave size of 500 bytes on a host which supports up to 32-byte bursts. Note that channel interleave size refers to the most data which will be transferred before another channel is allowed to transfer through the same bus. The transfer is to begin with the memory 400 through the ABus 460 to the dual-port memory 420 and from the dual-port memory 420 through the BBus 470 to its requesting peripheral unit 450. The channel interleave control 410 determines how to "slice up" the transfer by reading the channel interleave size, now 500 bytes, the total transfer count, now 1000 bytes, and the burst size, now 32 bytes, associated with channel 1. Thus, a 500-byte slice in 15 separate 32-byte bursts plus one 16-byte burst and one 4-byte transfer are written into the dual-port memory 420, while the channel sequencer 430 writes "channel 1" as the source channel corresponding to this slice of data.

After channel 1 has written the largest slice of data possible (500 bytes) without violating its channel interleave size of 500 bytes, another channel is allowed to use the ABus 460 to transfer data. If a DMA transfer through channel 7, for example, has been granted to use the ABus 460, transfer through channel 7 can interleave at this juncture. It should be noted that a computer system may have multiple buffering architecture (not shown in FIG. 4) to accommodate the DMA transfers such that another DMA channel may request to use a different buffering architecture to transfer. However, for the purpose of distinctly describing the operation of the present invention, it is assumed that all channel's use the same circuit architecture 401 to achieve DMA transfers. After the ABus 460 is granted to channel 7, transfer for channel 1 is suspended until channel 7 reaches its respective channel interleave size, provided that channel 1's request for the ABus 460 is also granted at that juncture. Although transfer for channel 1 is suspended, the channel interleave control 410 continues maintaining channel 1's transfer parameters, i.e. channel interleave size, total transfer size, and current transfer count so that channel 1 may subsequently resume its transfer unaffected by channel 7's interleaving.

Data transfer through channel 7 proceeds in a similar manner as in channel 1 with the exception that channel 7 may have been programmed to have different channel interleave size, total transfer size, and burst size such that the size of the data "slice" for channel 7 is different from channel 1. When a slice of channel 7 data is written from memory 400 to the dual-port memory 420, the channel sequencer 430 writes "channel 7" as the source channel corresponding to this slice of data written into the dual-port memory 420. If the next slice of transfer is also from channel 7, then channel 7 is written again as the source channel in the channel sequencer 430.

Figure 6A:
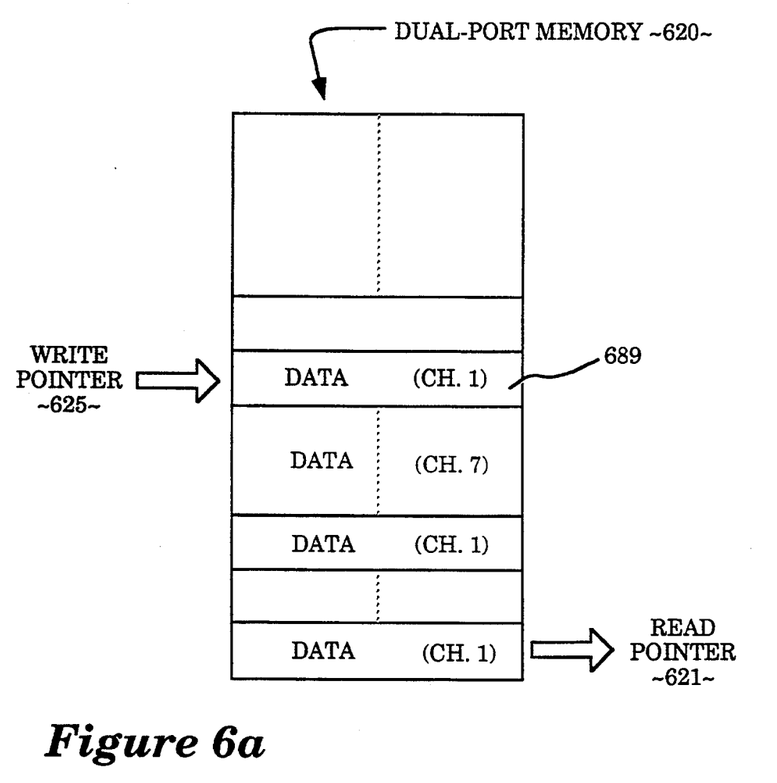
FIGS. 6(b) and 6(b) are pictorial representations of a circuit architecture in an exemplary write operation.
Figure 6B:
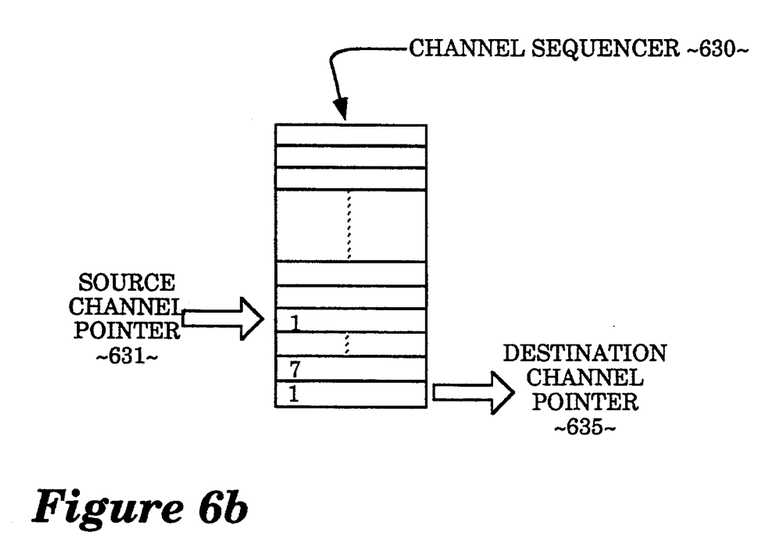

After channel 7 completes its transfer from the memory 400 to the dual-port memory 420, or at least partially completes data transfer allowed in the size of the channel interleave size, the ABus 460 is free to whichever channel getting its request granted. Assuming channel 1 gets its request granted, channel 1 can resume its data transfer from the memory 400 to the dual-port memory 420. Another slice of data is written into the dual-port memory 420, while the channel sequencer 430 writes "channel 1" as the source channel. FIGS. 6a and 6b illustrate the current status of the dual-port memory 620 and channel sequencer 621. Note that at start-up, the write pointer 625 and read pointer 621 are initially lined up at the first location in the dual-port memory 620 and the source channel pointer 631 and destination channel pointer 635 are also lined up at the first location of the channel sequencer 630.

With reference to FIGS. 6a and 6b, channel 1 continues transferring its requested total transfer count by writing a second slice of 500 bytes into locations in the dual-port memory 620 beginning with location 689, suspending its transfer if another channel is allowed to use the bus after channel 1's channel interleave size is reached. If no interleave occurs, channel 1 continues writing the remaining data into the dual-port memory 620, while the channel sequencer 630 records "channel 1" as the source channel for each slice concurrently.

Figure 5:
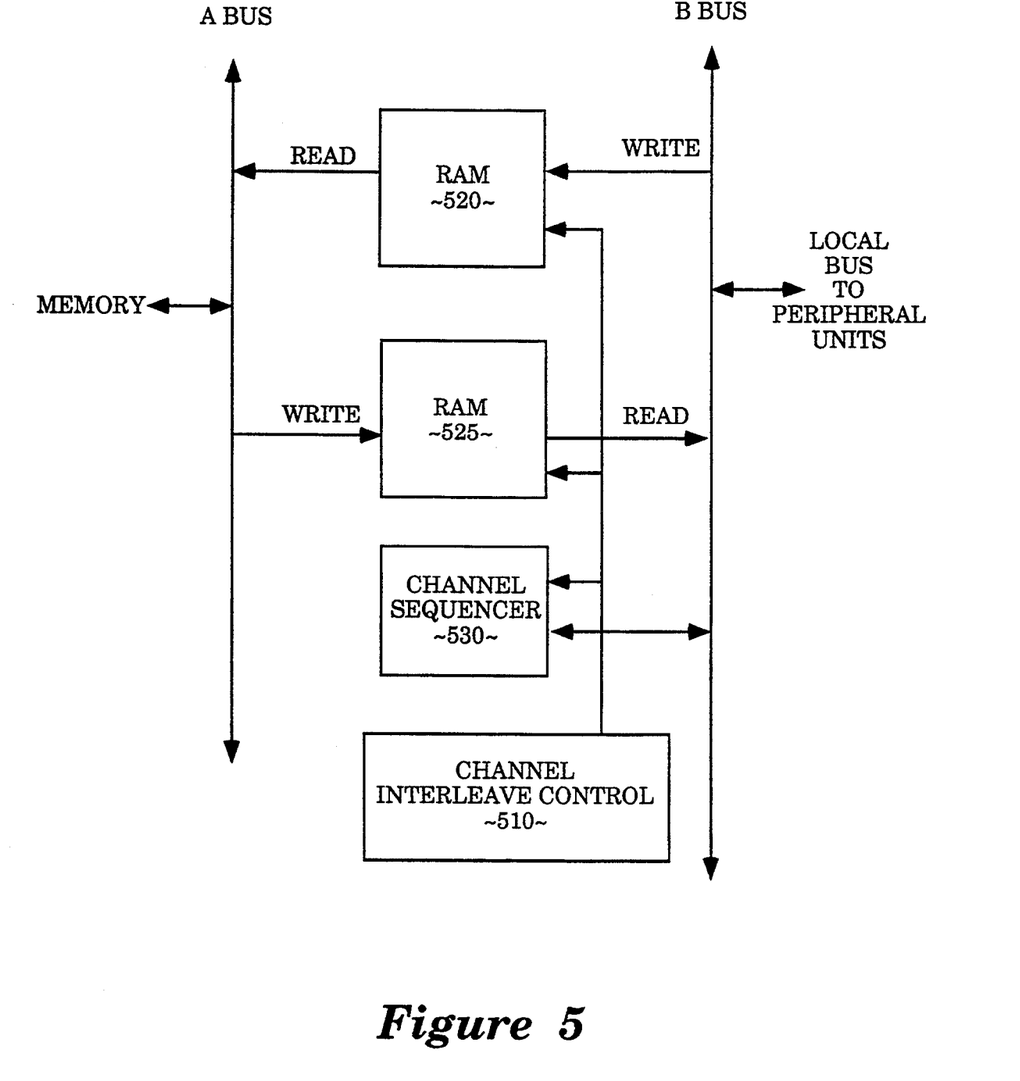
FIG. 5 is a pictorial representation of a circuit architecture in a preferred embodiment.

Referring to FIGS. 6a and 6b, a read pointer 621 is indicated coupled to the dual-port memory 620. Note that the read pointer 621 and write pointer 625 operate independently of each other such that the dual-port memory 620 can be writing and reading simultaneously through its dual write and read pointer mechanism. When data in the dual-port memory 620 are to be read out, they are read as the read pointer 621 moves along the dual-port memory 620. The destination of data is indicated by a destination channel pointer 635 coupled to the channel sequencer 630. Thus, data is read out of the dual-port memory 620 through its destination channel before the channel interleave size for that channel is violated. The destination channel pointer 635 increments to a next location in the channel sequencer 630, which indicates the destination channel of data to be read out of the dual-port memory 620 through the read pointer 621. As described in the write operation of the dual-port memory 620, read operations of the the dual-port memory 620 can also be interleaved to support multiple channels. Further, once the total transfer count is achieved in reading data out of the dual-port memory 620, another channel is allowed to read data out of the dual-port memory 620 even though the remaining transfer is less than its channel interleave size. Thus, more efficient bus utilization is achieved by not forcing the other channel to wait when there is no more data to transfer after the remnant is transferred. Currently, the dual-port memory 620 is implemented by two dual port random-access memory, as illustrated in FIG. 5.

Although the present circuit architecture has been described as the preferred embodiment for supporting channel-interleaving DMA operations, it should be apparent to those skilled in the art that the circuit architecture can be readily applied to other multiple-device transfer operations. For example, for data transfers between a CPU and a plurality of devices through a common transfer resource, the circuit architecture can provide independent read and write operations continuously while maintaining the transfer sequence of each device. With such a circuit architecture, the transfer resource can be efficiently utilized. During an operation, data for each device are stored in the dual-port memory, while a device identification is registered in the sequencer. Similar to the channel interleave mechanism, data transfer counts can be maintained to monitor the status of data flow for each device. Compared to the "one-buffer-per-device" approach, the circuit architecture can achieve higher band-width and continuity of operation without the cost of silicon area required by all the individual buffers.

I claim:

1. A circuit architecture for transferring data between a memory and a plurality of peripheral units of a computer through a plurality of data channels, comprising:

a dual-port memory coupled between said memory and said plurality of peripheral units for buffering a plurality of data slices being transferred through said plurality of data channels in a plurality of data locations, said dual-port memory comprising writing means and reading means for writing into and reading out of said dual-port memory, said writing means not writing to a data location before said data location is read out of said dual-port memory by said reading means such that said data location is not overwritten;

channel sequence means coupled to said dual-port memory for storing a plurality of data channel numbers therein, each of said plurality of data channel numbers corresponding to one of said plurality of data slices buffered in said dual-port memory, said channel sequence means for writing a first channel number to a location within said channel sequence means when a data slice from a first channel is written into said dual-port memory such that said first channel number represents a source channel of said data slice, said channel sequence means for reading said first channel number from said location when said data slice is read from said dual-port memory such that said first channel number represents a destination channel of said data slice, wherein said data slice is written into and read out of said dual-port memory through said first channel as stored in said channel sequence means; and channel interleave control means coupled to said dual-port memory and said channel sequence means for interleaving data transfers for said data channels through said dual-port memory, said channel interleave means for reading a predetermined channel interleave size, said predetermined channel interleave size corresponding to an amount of data which can be transferred by one of said plurality of data channels during a predetermined period of time, a total transfer count and a current transfer count corresponding to each data channel in both read and write directions to determine when a second channel interleaves, said channel interleave means allowing data to be transferred through said second channel after said first channel has transferred data of equal or less than its predetermined channel interleave size, said channel interleave means also allowing said second channel to transfer data after said first channel has completed its total transfer count such that said second channel transfers its data without waiting for said first channel to reach its predetermined channel interleave size.

2. A circuit architecture according to claim 1, wherein said dual-port memory further comprises:
write pointer means coupled to said dual-port memory for writing data into said dual-port memory, said write pointer means incrementing said dual-port memory from a last location to a first location in said dual-port memory; and
read pointer means coupled to said dual-port memory for reading data out of said dual-port memory, said read pointer means wrapping around said dual-port memory from the last location to the first location in said dual-port memory, said write pointer means not writing beyond said read pointer means such that data is not overwritten before it is read, wherein said dual-port memory is empty when said write pointer means coincides with said read pointer means.

3. A circuit architecture according to claim 2, wherein said channel sequence means further comprises:
source pointer means coupled to said channel sequence means for writing a channel number into said channel sequence means for a data slice to be transferred into said dual-port memory such that said channel number represents a source channel number of said data slice; and
destination pointer means coupled to said channel sequence means for reading a channel number in said channel sequence means when a data slice is to be read out of said dual-port memory such that said channel number represents a destination channel number of said data slice, said destination pointer means not passing said source pointer means and said source pointer means not passing said destination pointer means.

4. A circuit architecture according to claim 3, wherein said dual-port memory comprises two dual-port random-access memories, each of said two dual-port random-access memories selectively and independently transferring data from said memory to said peripheral units and from said peripheral units to said memory, respectively.

5. A method of transferring data through a circuit architecture coupled between a memory and a plurality of peripheral units of a computer, said memory and said peripheral units being coupled through a plurality of DMA channels, comprising the steps of:
storing a plurality of data slices being transferred through said plurality of DMA channels in a plurality of data locations, said plurality of data locations being in a dual-port memory coupled between said memory and said peripheral units, said dual-port memory comprising writing means and reading means for writing into and reading out of said dual-port memory, said writing means not writing to a data location before said data location is read out of said dual-port memory by said reading means such that said data location is not overwritten;
storing a plurality of DMA channel numbers in channel sequence means coupled to said dual-port memory, each of said plurality DMA channel numbers corresponding to one of said data slices buffered in said dual-port memory, said channel sequence means writing a first channel number into a location within said channel sequence means when a data slice from a first channel is written into said dual-port memory such that said first channel number represents a source channel of said data slice, said channel sequence means reading said first channel number from said location when said data slice is read from said dual-port memory such that said first channel number represents a destination channel of said data slice, wherein said data slice is written into and read out of said dual-port memory through said first channel as stored in said channel sequence means; and
interleaving data transfers for said DMA channels through said dual-port memory by using a channel interleave means coupled to said dual-port memory and said channel sequence means, said channel interleave means reading a predetermined channel interleave size, said predetermined channel interleave size corresponding to an amount of data which can be transferred by one of said plurality of data channels during predetermined period of time, a total transfer count and a current transfer count corresponding to each DMA channel in both read and write directions to determine when a second channel interleaves, said channel interleave means allowing data to be transferred through said second channel after said first channel has transferred data of equal or less than its predetermined channel interleave size, said channel interleave means also allowing said second channel to transfer data after said first channel has completed its total transfer count such that said second channel transfers its data without waiting for said first channel to reach its predetermined channel interleave size.

6. A method according to claim 5, wherein the step of storing a plurality of data slices being transferred through said plurality of DMA channels in a plurality of data locations further comprises the steps of:
writing data into said dual-port memory by using a write pointer means coupled to said dual-port memory, said write pointer means incrementing said dual-port memory from a last location to the first location in said dual-port memory;
reading data out of said dual-port memory by using a read pointer means coupled to said dual-port memory, said read pointer means incrementing said dual-port memory from the last location to the first location in said dual-port memory, said write pointer means not writing beyond said read pointer means such that data is not overwritten before it is read, wherein said dual-port memory is empty when said write pointer means coincides with said read pointer means.

7. A method according to claim 5, wherein the step of storing a plurality of data channel number in said channel sequence means further comprises the steps of:
writing a channel number into said channel sequence means by using a source pointer coupled to said channel sequence means for a data slice to be transferred into said dual-port memory such that said channel number represents a source channel number of said data slice;
reading said channel number in said channel sequence means by using a destination pointer coupled to said channel sequence means when a data slice is to be read out of said dual-port memory such that said channel number represents a destination channel number of said data slice, said destination pointer not passing said source pointer and said source pointer not passing said destination pointer.

8. A method according to claim 5, wherein the step of storing a plurality of data channel number in said channel sequence means further comprises the steps of:

writing a channel number into said channel sequence means by using a source pointer coupled to channel sequence means for a data slice to be transferred into said dual-port memory such that said channel number represents a source channel number of said data slice;

reading a channel number in said channel sequence means by using a destination pointer coupled to said channel sequence means when a data slice is to be read out of said dual-port memory such that said channel number represents a destination channel number of said data slice, said destination pointer not passing said source pointer and said source pointer not passing said destination pointer.

9. A method according to claim 5, further comprising a step of arbitrating among said plurality of data channels to transferring data into and out of said two-port memory.

* * * * *